Patented Nov. 12, 1929

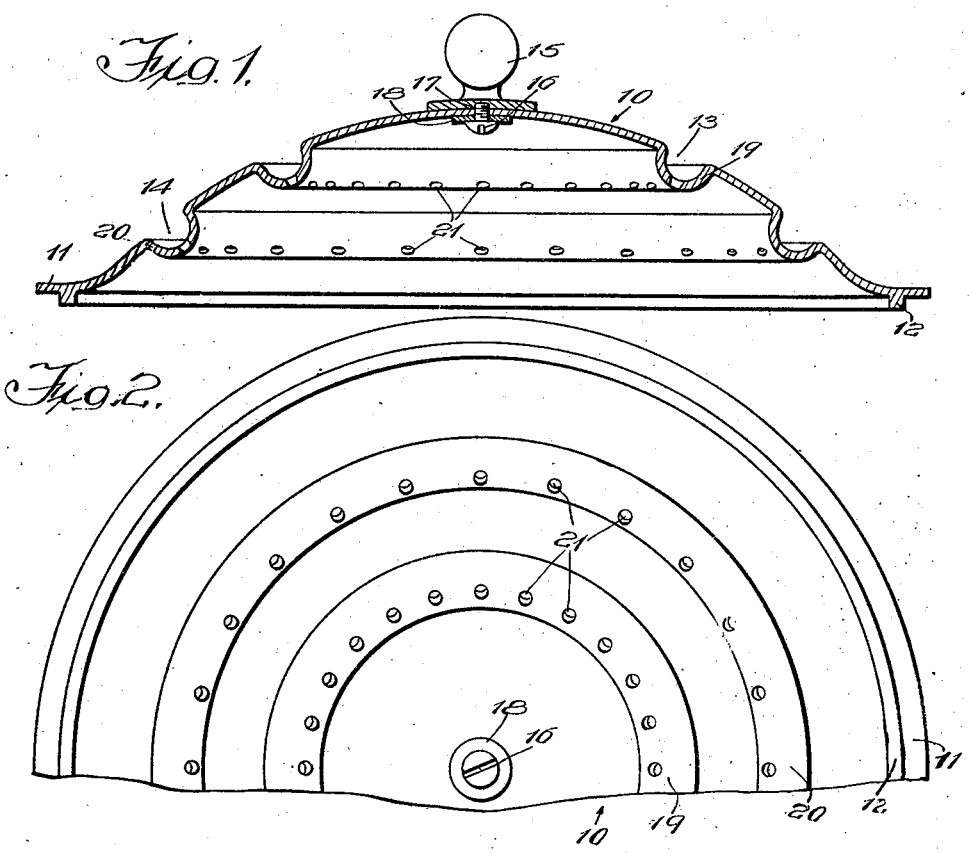

1,735,589

UNITED STATES PATENT OFFICE

OLAF TOLLAGSEN, OF CHICAGO, ILLINOIS, ASSIGNOR TO ALUMINUM GOODS MANUFACTURING COMPANY, OF MANITOWOC, WISCONSIN, A CORPORATION OF NEW JERSEY

SELF-BASTING COVER

Application filed November 20, 1926. Serial No. 149,549.

The present invention pertains in general to covers for culinary vessels and more particularly to self-basting covers for roasting pans and the like of the same general type as that disclosed in my Patent No. 1,598,222, dated August 31, 1926; the subject matter of the present application being in part divisional of this patent.

In accordance with the general features of my present invention I provide a cover equipped with means for promoting the condensation of the vaporized juices of the roast, for directing and distributing the juices evenly over the roast, for allowing the steam to escape thereby producing a solution of highly condensated grease which is so essential to a thorough browning of the roast, and which is self-basting to such an extent that the attention of a person will not be required.

It is of course, to be understood that although I shall describe my invention as being particularly useful in connection with roasters, the invention is not to be thus limited but only in so far as defined by the appended claims.

Other objects and advantages of my invention will more fully appear from the following detailed description taken in connection with the accompanying drawing which illustrates several embodiments thereof and in which—

Figure 1 is a cross sectional view through the preferred form of my cover;

Fig. 2 is a fragmentary bottom plane of the cover shown in Fig. 1.

Referring now to the drawing in detail in which like reference numerals designate similar parts throughout the several views and more particularly to Figs. 1 and 2, 10 denotes generally a dome-shaped cover having an annular flat rim 11 equipped with a downwardly extending annular flange 12. The rim 11 and the flange 12 are adapted to cooperate with the roaster such as that disclosed in my Patent 1,598,221.

The dome-shaped cover 10 is preferably of a semi-spherical form and includes a pair of annular troughs 13 and 14. The body of the cover 10 may be pressed from suitable metallic sheet and is preferably a punch press product. The cover 10 is equipped with a handle 15 which takes the form of a knob mounted approximately centrally of the cover and held in place by means of a screw 16 which passes through an aperture 17 in the cover and is threaded into the knob. A washer 18 is preferably placed between the head of the screw and the interior of the cover.

The trough 13 is defined by a downwardly extending ridge-like projection 19 which has an arcuate cross section. Similarly, the annular trough 14 is defined by a downwardly extending annular ridge-like projection 20 which also has an arcuate cross section. These two projections 19 and 20 are preferably disposed on the underside of the cover 10.

It will be noted from Figs. 1 and 2 that each of the projections 19 and 20 is equipped with a plurality of apertures 21 spaced a given distance from each other. Furthermore, I preferably make each of these apertures of a nozzle-like or tapering shape, the purpose of which will be more fully described hereinafter.

The tapered apertures 21 serve as a means for permitting the steam to pass through the cover. Also, the apertures form air vents for the interior of the vessel and serve to prevent the boiling over of the contents within the associated roaster. Furthermore, the apertures promote condensation of the vaporized juices of the meat or other food being roasted and assist the downwardly depending ridges 19 and 20 in collecting and distributing the condensate uniformly over the roast. Each aperture or opening is tapered and its size is independent of the size of the associated projection or ridge. The advantage of this construction is that it enables a relatively large projection to be used without increasing the size of the opening 21. It will be evident that by providing relatively large annular ridges or projections a greater condensing surface is afforded the vapors within the associated vessel. Moreover, by providing relatively small openings only part of the vapors are allowed to escape. Also, a part of these escaping vapors will condense in the troughs 13 and 14 and gravitate back into the vessel thoroughly and uniformly basting the roast therein.

By tapering the opening 21 I find that I can increase the condensing surface of the ridges or projections. Also, the tapered openings in reality serve as pockets in which the condensate is adapted to accumulate.

Now I desire it understood that although I have illustrated and described in detail the preferred embodiment of my invention, the invention is not to be thus limited but only in so far as defined by the scope and spirit of the appended claims.

I claim:

1. As an article of manufacture, a self-basting roaster cover having an upwardly domed central portion surrounded by an annular marginal seat disposed wholly below said upwardly domed portion and adapted for supporting the cover upon the roaster, a plurality of inwardly directed annular depressions in said upwardly domed portion, each of said annular depressions being disposed wholly above the annular seat of the cover and out of contact with the contents of the roaster, and each continuous annularly about the upwardly domed portion of the cover, and means including a plurality of circularly spaced conical apertures in said annular depressions for permitting steam to pass therethrough, each of said apertures being independent of the size of the depressions and also being of such a size as to permit the passage of steam, but prevent the passage of the more viscous fats and the depressions forming annular external troughs for collecting condensate and distributing same uniformly to said apertures to provide a substantially uniform basting action over the entire contents of the roaster.

2. As an article of manufacture, a unipiece self-basting roaster cover having an upwardly domed central portion surrounded by an annular marginal seat disposed wholly below said upwardly domed portion and adapted for supporting the cover upon the roaster, and an inwardly directed annular depression in said upwardly domed portion wholly above the annular seat of the cover and wholly out of contact with the contents of the roaster, said depression being continuous annularly about the upwardly domed portion of the cover, and means including a plurality of circularly spaced conical apertures in said annular depression for permitting steam to pass therethrough, each of said apertures being independent of the size of the depression and also being of such a size as to permit the passage of steam, but prevent the passage of the more viscous fats and the depressions forming an annular trough for collecting condensate and distributing same uniformly to said apertures to provide a substantially uniform self-basting action over the contents of the roaster.

In witness whereof, I hereunto subscribe my name this 16th day of November, 1926.

OLAF TOLLAGSEN.